United States Patent [19]

Dwivedi

[11] Patent Number: 5,304,520
[45] Date of Patent: * Apr. 19, 1994

[54] POROUS CERAMIC COMPOSITE WITH DENSE SURFACE

[75] Inventor: Ratnesh K. Dwivedi, Wilmington, Del.

[73] Assignee: Lanxide Technology Company, LP, Newark, Del.

[*] Notice: The portion of the term of this patent subsequent to Sep. 11, 2007 has been disclaimed.

[21] Appl. No.: 931,184

[22] Filed: Aug. 17, 1992

Related U.S. Application Data

[60] Continuation of Ser. No. 699,403, May 13, 1991, Pat. No. 5,139,977, which is a continuation of Ser. No. 414,183, Sep. 28, 1989, Pat. No. 5,015,610, which is a division of Ser. No. 908,119, Sep. 16, 1986, Pat. No. 4,956,137.

[51] Int. Cl.$^5$ .................... C04B 35/71; C04B 35/02
[52] U.S. Cl. ..................... 501/127; 501/94; 501/153; 501/154; 501/102; 428/404; 428/545; 428/566; 264/60; 264/65
[58] Field of Search ............... 501/127, 94, 153, 154, 501/102; 428/404, 545, 566; 264/60, 65

[56] References Cited

U.S. PATENT DOCUMENTS

| | | | |
|---|---|---|---|
| 2,741,822 | 4/1956 | Udy | 264/65 |
| 3,255,027 | 6/1966 | Talsma | 264/65 |
| 3,262,763 | 7/1966 | Bechtold | 801/98 |
| 3,296,002 | 1/1967 | Hare | 501/80 |
| 3,298,842 | 1/1967 | Seufert | 501/127 |
| 3,419,404 | 12/1968 | Mao | 501/98 |
| 3,421,863 | 1/1969 | Bawa | 501/128 |
| 3,437,468 | 4/1969 | Seufert | 75/235 |
| 3,473,938 | 10/1969 | Oberlin | 264/65 |
| 3,473,987 | 10/1969 | Sowards | 501/119 |
| 3,551,101 | 12/1970 | Matsuo | 423/412 |
| 3,720,543 | 3/1973 | Bockstie | 428/432 |
| 3,789,096 | 1/1974 | Church | 264/60 |
| 3,864,154 | 2/1975 | Gazza et al. | 428/539.5 |
| 3,973,977 | 8/1976 | Wilson | 501/120 |
| 4,059,544 | 11/1977 | Yamaguchi et al. | 501/82 |
| 4,777,014 | 10/1988 | Newkirk et al. | 501/96 |
| 4,851,375 | 7/1991 | Newkirk et al. | 501/127 |
| 4,956,137 | 9/1990 | Dwivedi | 501/127 |
| 5,015,610 | 5/1991 | Dwivedi | 501/127 |
| 5,139,977 | 8/1992 | Dwivedi | 501/128 |

FOREIGN PATENT DOCUMENTS

| | | |
|---|---|---|
| 0116809 | 8/1984 | European Pat. Off. |
| 0155831 | 9/1985 | European Pat. Off. |
| 0169067 | 1/1986 | European Pat. Off. |

*Primary Examiner*—Mark L. Bell
*Assistant Examiner*—Paul Marcantoni
*Attorney, Agent, or Firm*—Mark G. Mortenson; Carol A. Lewis

[57] ABSTRACT

There is disclosed a method for making a self-supporting ceramic composite article having a porous core bearing a dense surface layer formed integrally with said core. A preform comprises a filler material and parent metal distributed therethrough, wherein the volume percent of parent metal is sufficient to form a volume of oxidation reaction product exceeding the total volume available within said preform. The parent metal is melted and reacted with an oxidant to form an oxidation reaction product filling the spatial volume and leaving voids. The reaction is continued to further transport molten parent metal through the oxidation reaction product to at least one surface of the preform to form oxidation reaction product on said surface substantially free of voids thereby forming a relatively dense surface layer.

7 Claims, 3 Drawing Sheets

POROUS CERAMIC COMPOSITE WITH DENSE SURFACE

This is a continuation of Ser. No. 699,403 filed on May 13, 1991, which issued on Aug. 18, 1992 as U.S. Pat. No. 5,139,977, which is a continuation of U.S. patent application Ser. No. 07/414,183, which is a divisional of U.S. patent application Ser. No. 06/908,119, which issued on Sep. 11, 1990, as U.S. Pat. No. 4,956,137.

FIELD OF THE INVENTION

The present invention relates, generally, to self-supporting porous ceramic composites having a dense skin or dense surface layer, and to methods for producing such articles in near net shape, which exhibit improved wear, strength, and thermal properties.

DESCRIPTION OF COMMONLY OWNED PATENT APPLICATIONS PATENTS AND PRIOR ART

The subject matter of this application is related to copending and commonly owed U.S. patent applications Ser. No. 818,943, filed Jan. 15, 1986, now U.S. Pat. No. 4,713,360 which is a continuation-in-part of Ser. No. 776,964, filed Sep. 17, 1985, which is a continuation-in-part of Ser. No. 705,787, filed Feb. 26, 1985, which is a continuation-in-part of U.S. application Ser. No. 591,392, filed Mar. 16, 1984, all in the name of Marc S. Newkirk et al. and entitled "Novel Ceramic Materials and Methods for Making the Same." These applications disclose the method of producing self-supporting ceramic bodies grown as the oxidation reaction product from a parent metal precursor. Molten parent metal is reacted with a vapor-phase oxidant to form an oxidation reaction product, and the metal migrates through the oxidation product toward the oxidant thereby continuously developing a ceramic polycrystalline body which can be produced having an interconnected, metallic component. The process may be enhanced by the use of an alloyed dopant, such as in the case of an aluminum parent metal oxidized in air. This method was improved by the use of external dopants applied to the surface of the precursor metal as disclosed in commonly owned and copending U.S. patent applications Ser. No. 220,935, filed on Jun. 23, 1988, now U.S. Pat. No. 4,853,352, which is a continuation of Ser. No. 822,999, filed Jan. 27, 1986, which is a continuation-in-part of Ser. No. 776,965, filed Sep. 17, 1985, which is a continuation-in-part of Ser. No. 747,788, filed Jun. 25, 1985, which is a continuation-in-part of Ser. No. 632,636, filed Jul. 20, 1984, all in the name of Marc S. Newkirk et al and entitled "Methods of Making Self-Supporting Ceramic Materials."

The subject matter of this application is also related to that of commonly owned and copending U.S. patent applications Ser. No. 819,397, filed Jan. 17, 1986, now U.S. Pat. No. 4,851,375 which is a continuation-in-part of Ser. No. 697,876, filed Feb. 4, 1985, both in the name of Marc S. Newkirk et al. and entitled "Composite Ceramic Articles and Methods of Making Same". These applications disclose a novel method for producing self-supporting ceramic composites by growing an oxidation reaction product from a parent metal into a permeable mass of filler, thereby infiltrating the filler with a ceramic matrix.

Composite bodies comprising a metal boride, a metal component and, optionally, an inert filler are disclosed in commonly owned and copending U.S. patent application Ser. No. 837,448, filed Mar. 7, 1986, now U.S. Pat. No. 4,777,014 in the name of Marc S. Newkirk et al. and entitled "Process of Preparing Self-Supporting Bodies and Products Made Thereby." According to this invention, molten parent metal infiltrates a mass of a boron source, which may be admixed with an inert filler, and reacts with the boron source thereby forming a parent metal boride. The conditions are controlled to yield a composite body containing varying volume percents of ceramic and metal.

Common to each of these Commonly Owned Patent Application and Patents is the disclosure of embodiments of a ceramic body comprising an oxidation reaction product interconnected in one or more dimensions (usually in three dimensions) and one or more metallic constituents or components. The volume of metal, which typically includes non-oxidized constituents of the parent metal and/or metal reduced from an oxidant or filler, depends on such factors as the temperature at which the oxidation reaction product is formed, the length of time at which the oxidation reaction is allowed to proceed, the composition of the parent metal, the presence of dopant materials, the presence of reduced constituents of any oxidant or filler materials, etc.

The entire disclosure of all of the foregoing Commonly Owned Patent Applications and Patents are expressly incorporated herein by reference.

BACKGROUND AND PRIOR ART

In recent years, there has been an increasing interest in the use of ceramic materials as structural components in environments historically dominated by metallic members. The impetus for this interest has been the superiority of ceramics when compared with metals with respect to certain properties such as corrosion resistance, hardness, modulus of elasticity, thermal insulation or conduction properties, and refractory capabilities. As a consequence, ceramics have been selected, or are under development, for use as engine components, heat exchangers, cutting tools, bearings and wear surfaces, pumps and marine hardware.

From among the enumerated fields of utility, the integration of ceramic materials into internal combustion engines offers a significant opportunity for functional improvement and resultant efficiency. Ceramics have lower coefficients of friction than metals contributing to mechanical properties which are superior to those of mating metals, which is true even in the high temperature environment of internal combustion engine. Ceramics also exhibit more favorable characteristics respective dimensional stability over the wide temperature ranges encountered. Certain ceramics are thermal insulators when compared with metals, and this too provides an opportunity for improved engine efficiencies since a large proportion (reportedly as high as about 75%) of the energy of fuel can be lost as waste heat. The goal of designing an adiabatic internal combustion engine employing ceramics, with their low thermal conductivity but good dimensional stability, becomes close to realization in efforts to utilize more completely the energy value of the combusted fuel. Accordingly, advances in ceramic material development are being driven by long-felt pragmatic needs.

Other properties of ceramic components, however, have limited their full involvement in certain hostile environments calling for members which possess good structural integrity, with reduced tendencies toward wear from erosion or cavitation. Of course, fully densified ceramic materials may meet some of these requirements; however, manufacturing fully dense ceramics, and particularly those having any complexity of shape, is difficult when low-cost reproducibility part-to-part in mass production are also requirements.

Limited success has been attained in efforts to manufacture dense ceramic components, whether as an integral article or as a composite. One such approach is disclosed in U.S. pat. No. 3,437,468 to Seufert. This patent relates to alumina/spinel ceramic composites. The process disclosed includes establishing a molten pool of aluminum covered with a thick layer of finely divided magnesium silicate particulate. Molten aluminum is transported through the particulate layer wherein it is partially oxidized via the oxidation-reduction of aluminum and magnesium silicate as well as oxidation via atmospheric oxygen. The process ultimately yields a composite of multiple oxide phases and metal phases; namely, spinel, alpha-alumina, free silicon and/or a silicon-aluminum phase reported as an intermetallic, usually also including elemental or free aluminum. The reaction tends to be slow, and oxidation is promoted such as by means of an alkali metal oxide. The product is recovered and ground to a desired particle size, and then mixed with suitable resins to form molded, high-friction articles.

There have been other attempts to produce ceramic structures more nearly approximating the net shape of the desired article by using particulate precursor metal and air oxidation. U.S. Pat. No. 3,255,027 to Talsma, U.S. Pat. No. 3,473,938 to Oberlin, and U.S. Pat. No. 3,473,987 to Sowards disclose such processes for making integral skeletal structures, e.g. honeycomb. In the '027 patent, particulate aluminum or aluminum alloy is combined with a metallic oxide fluxing agent, and also may include a particulate filler refractory. The admixture is oxidized to convert the aluminum to corundum. A generally porous structure is developed having intrinsically low strength properties.

The invention of the '027 patent is characterized by its assignee as producing a structure having an interior void. The '938 patent proposes to overcome this drawback by incorporating within the initial mix a vanadium compound which, under process conditions, causes the formation of alumina bridges. The '987 patent also purports to improve the strength of the double-walled alumina product of Talsma by the in situ oxidation of aluminum templates if the templates are coated with aluminum powder, a fluxing agent, and a refractory filler.

U.S. Pat. No. 3,298,842 to Seufert discloses a method for forming hollow refractory particles such as hollow alumina particles. A porous admixture of aluminum particles or aluminum alloy particles, a refractory diluent, and a catalyst is heated in air to a temperature above about 650° C. but below that at which self-bonding or sintering of the refractory diluent would occur. The metallic particles oxidize at their surfaces, consuming the free metal and leaving behind a void to yield the hollow refractory particles which are physically separated from the refractory diluent. The diluent may be inert or reactive within that process; when the former, it is present in an amount of at least five times the volume of the metallic constituent, in the latter it is present in an amount at least seven times that of the metallic component. These substantial proportions of diluent are necessary to minimize agglomeration of the oxidized particles and, accordingly, to avoid a continuously bonded structure which would render recovery of the desired alumina particles more difficult. Further along these lines, the admixture is fired in a relatively uncompacted form to reduce tendencies toward diluent bonding while producing ready access of the oxidant to the aluminum of the admixture. Porosities of at least 60%, and more preferably 70%, are recommended by that patentee.

While much attention has been paid and considerable efforts devoted to the fabrication of ceramic articles, including the manufacture of ceramic articles by in situ oxidation of precursor metals, these previous attempts have been lacking in one or more respects with regard to the development of products having structural integrity rendering them suitable as articles of commerce. For example, the migration of aluminum from a foil configuration to develop a double-walled ceramic structure severely handicaps an article manufactured in that way from adaptation as a structural component for lack of strength, particularly compressive and/or flexural strengths. Certain of the fabrication techniques themselves are cumbersome, requiring repetitive coatings of templates or the like interspersed with drying steps.

A further deficiency of past approaches utilizing in situ oxidation of powders, foils and wires to create ceramic bodies has been the exceedingly poor contact wear and erosion resistance of such bodies. It is the inherent porosity of the products of the prior art which is responsible for their poor structural and wear properties and this has greatly limited any practical utility of such inventions.

Those approaches which oxidize a template and thus strive to attain that goal are limited to producing inherently weak structures. On the other hand, other efforts which have to date yielded ceramic structural components of acceptable strength have been limited to manufacturing processes requiring high pressures and temperatures in order to accomplish sintering and densification of their constituents, making their costs disadvantageous. Accordingly, the art, is, in the main, lacking in respect of efficient methods for producing useful structural articles.

SUMMARY OF THE INVENTION

The present invention provides self-supporting ceramic articles having a porous core enveloped by or bearing a relatively dense skin on at least one surface, to yield a ceramic structure exhibiting desired properties such as improved wear and thermal properties. Further, the ceramic articles produced in accordance with the present invention are capable of serving in a structural role, due to the load-carrying capacity of the dense skin. In a preferred embodiment, the product of the present invention has a porous core surrounded by a substantially dense, wear-resistant, higher strength layer which approximates about 5–15% of the thickness of the wall of the ceramic article.

Self-supporting ceramic composite articles having a porous core and bearing a dense surface layer formed integrally with the core are made by a controlled oxidation reaction of a parent metal with an oxidant to "grow" an oxidation reaction product. The method entails preparing a preform of a predetermined shape comprising a parent metal and a filler material wherein said parent metal is distributed through said filler material. The volume percent of parent metal is sufficient to form a volume of oxidation reaction product which exceeds all potentially available spatial volume within the preform and therefore provides a residual volume of parent metal to undergo further oxidation reaction for development of the dense surface layer. That is, the volume percent of the oxidation reaction product resulting from the oxidation of parent metal is greater than any spatial volume initially present as porosity in the preform plus any spatial volume created within the preform by a reaction of the parent metal or its oxidation reaction product, with the filler during the process of the present invention. Process conditions are controlled to maintain the parent metal in a molten state in the presence of the oxidant, with which it reacts on contact to form an oxidation reaction product. The process is continued to induce transport of the molten metal through the oxidation reaction product towards the oxidant to continue forming additional oxidation reaction product upon contact with the oxidant within the preform and to fill any pore volume therewith. Concurrently, voids are formed throughout the preform substantially or partially replicating the parent metal's configuration as it existed in the original preform. Once any initial pore volume of the preform is filled with oxidation reaction product, residual molten metal continues migration under the controlled process conditions through the oxidation reaction product and towards the oxidant to at least one surface of the preform to develop additional oxidation reaction product as a substantially dense layer overlying and integral with the porous core which develops from the original preform. The dense layer or skin which overgrows the outer surface of the preform is substantially free of the voids which form by the inverse replication of the configuration of parent metal originally distributed through the preform, and therefore is substantially dense relative to the core. The resulting self-supporting composite possessing a dense outer layer exhibits superior wear and erosion properties relative to the porous core, and the porous core possesses or exhibits superior thermal insulating properties relative to the dense skin. Further, the composite body tends to have improved thermal conductivity in the directions perpendicular to its surface within the dense skin layer while maintaining lower thermal conductivity properties perpendicular to its surface through its porous core. These characteristics are governed, and the resultant properties of the finished article are tailored, in part by appropriate selection of the constituents of the preform, the oxidant or oxidants employed and of the process conditions.

A further feature of the composite body of the present invention is the structural strength of the body, which is due to the denser, finer-grained microstructure of the skin relative to the core. Stresses upon a structural body such as torsional and bending stresses typically are maximized of value at the surface of the structural body. Thus the strong, dense skin of the composite body of the present invention maximizes a potential for the otherwise weak, porous core to serve structural needs, while yet retaining the low thermal conductivity and light weight characteristics of the core.

In fact, the very features described above and combined in the composite bodies of the present invention ideally suit the requirements for many hot zone components currently in demand for heat engines. For example, combustion chamber liners, cylinder liners, piston caps, exhaust port liners, exhaust manifolds and turbocharger housings are examples of heat engine components which require high surface thermal conductivity in directions parallel to the surfaces of the component to prevent "hot spots" and excessive thermal stress, and low thermal conductivity in directions perpendicular to such surfaces to prevent damage to less heat-resistant components and/or prevent heat loss; high tensile, bend and compressive strengths to tolerate such stresses as combustion pressures, or stresses imposed on casting such components as inserts into metal castings; good wear characteristics such as either sliding contact wear (as in the case of a diesel engine cylinder liner) and/or erosion resistance to unburned combustion products such as carbon (as in the case of an exhaust port liner); low surface porosity to prevent condensed combustion products such as water from entering pores, then freezing and causing fracture; and light weight.

Typically, porous ceramic components are too weak to allow casting metals around them such as would be desirable for many heat engine applications. This is especially true of hollow porous structures such as ceramic exhaust port liners, cylinder liners, combustion chambers, etc., which tend to crack and be crushed as the casting metal shrinks on cooling. It has been discovered that many of the products of the present invention have sufficient strength to permits such metal casting around them without fracture or disintegration.

The preform for the process of the present invention is comprised of a parent metal and a filler wherein said parent metal is distributed through said filler. The filler may be either nonreactive or reactive with the parent metal under the conditions of the process. In accordance with one embodiment of the invention, the preform may be comprised of an aluminum parent metal particulate and alumina filler particulate which, under the process conditions described herein, is a nonreactive admixture. In such embodiment one or more dopants as further described herein are employed, either alloyed into the aluminum parent metal or distributed through the filler, or both, in order to facilitate the oxidation of the parent metal and transport of the parent metal through its reaction product. This nonreactive admixture is treated by the oxidation reaction process as described to develop the porous ceramic with a dense surface layer. In an alternative embodiment, a reactive admixture may be comprised of a parent metal and a filler material having a metallic constituent which is reducible by the molten parent metal in an oxidation-reduction reaction. In that case, the parent metal is present in a stoichiometric excess over that necessary to react with the metallic compound constituent of the filler to ensure a sufficient volume of residual or unreacted parent metal for participation in the subsequent oxidation reaction to form the oxidation reaction product as the dense layer. In this alternate procedure, the preform is heated to a temperature sufficient to initiate the oxidation-reduction reaction (i.e., a "reaction-effective" temperature) prior to any substantial atmospheric oxidation of the parent metal, whereby an oxidation-reduction product is first formed substantially through the bulk of the preform. In many cases, the oxidation-reduction reaction is exothermic, rapidly heating the preform and assisting in the conversion of the parent metal to its molten reactive form. In one variant of the present invention, all steps following the oxidation-reduction reaction are conducted under substantially isothermal conditions; however, temperature variations may be introduced to control or tailor growth and microstructure of the surface layer.

An article of near net shape may be obtained by suitable consolidation of the assemblage of parent metal and filler into a green preform having shape-sustaining characteristics and then controlling the reaction(s) which ensue upon heating. The pore volume of the preform is typically at least about 5% but is, more preferably, in the range of from about 25% to about 35%. That pore volume is balanced against the volume of reactive parent metal, the oxidation reaction product of which exceeds the pore volume; i.e., there must be a sufficient quantity of metal to ensure that the oxidation reaction product, or the oxidation-reduction reaction product, fills these interstitial spaces (inter-particle pore volume plus any spatial volume created within the preform during the process of the preform. Thereafter, the oxidation reaction product forms the dense surface.

The dense layer is predominantly comprised of the oxidation reaction product. In addition, this dense layer may include, for example, residual parent metal, the reduced (metallic) constituent of any metallic compound which entered into the oxidation-reduction reaction, an alloy or intermetallic compound between the parent metal and a constituent thereof or of any reduced metal, depending upon such factors as the type of filler used, the process conditions, and the use of dopant materials. The ceramic articles made from a nonreactive assemblage of parent metal and filler may comprise up to about 25% or more by volume of metallic constituents, preferably from about 5% to about 10%. Those ceramic articles fabricated from reactive assemblages of parent metal and filler may comprise about 20% to about 40% or more of metallic constituents, but preferably about 25% to about 35%.

Articles produced in accordance with the procedure summarized above, and particularly those denoted as preferred, exhibit substantially improved structural integrity over similar type articles of the prior art while possessing as well, significantly enhanced thermal characteristics (e.g., insulating properties) coupled with good wear properties. Composite ceramic structures in accordance with the present invention advantageously may function as structural components in heat engines and similar environments requiring such engineering characteristics as light weight, strength, wear, erosion, and corrosion.

In this specification and the appended claims the following terms have the following meaning:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents derived from the parent metal, or reduced from the filler oxidant or a dopant, most typically within the range of from about 1–40% by volume, but may include still more metal.

"Oxidation reaction product" means one or more metals in any oxidized state wherein the metal(s) have given up electrons to or shared electrons with another element, compound, or combination thereof. Accordingly, an "oxidation reaction product" under this definition includes the product of the reaction of one or more metals with an oxidant such as oxygen, nitrogen, forming gas (about 96% nitrogen and 4% hydrogen), a halogen, sulphur, phosphorus, arsenic, carbon, boron, selenium, tellurium, and compounds and combinations thereof including, for example, reducible metal compounds, methane, ethane, propane, acetylene, ethylene, propylene and mixtures such as air, $H_2/H_2O$ and a $CO/CO_2$, the latter two (i.e., $H_2/H_2O$ and $CO/CO_2$) being useful in reducing the oxygen activity of the environment.

"Oxidant" means one or more suitable electron acceptors or electron sharers which will react with the parent metal under the present conditions, and may be a solid, a liquid, or a gas (vapor) or some combination of these (e.g., a solid and a gas) at the process conditions. This definition is meant to include a compound reducible by the parent metal.

"Parent metal" refers to that metal, e.g. aluminum, titanium, silicon, zirconium, hafnium, tin, etc., which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g. aluminum, the metal identified should be read with this definition in mind unless indicated otherwise by the context.

The term "filler" as used herein is intended to include either single constituents or mixtures of constituents which may be either reactive or non-reactive, may be single or multi-phase, and may include no oxidant or one or more oxidants. Filler may be provided in a wide variety of forms, such as powders, flakes, platelets, microspheres, whiskers, bubbles, etc., and may be either dense or porous.

DETAILED DESCRIPTION OF THE INVENTION AND PREFERRED EMBODIMENTS

Figure 1:
FIG. 1 is a photograph of the ceramic composite exhaust port liner of Example 1 below.

The ceramic composites made in accordance with the present invention are fabricated from a preform comprising a consolidated assemblage of a parent metal and a filler, wherein said parent metal is distributed through said filler. Examples of assemblages of a parent metal distributed through a filler would include, for example, parent metal powder mixed with a ceramic powder or a mixture of ceramic powders serving as filler. Other examples include a parent metal open-cell sponge whose cells are filled with a ceramic powder, or short metal fibers mixed with ceramic platelets, or a layup of metal screen layers filled in with ceramic whiskers, or an admixture of metal flake or metal shot with ceramic microspheres. The assemblage is fabricated to a desired shape to yield the preform. The preform is provided with sufficient green strength to withstand handling, and preferably approximates the net shape of the ceramic article to be produced. The preform may be porous in the sense that it is not fully dense but includes interstitial pores between particles or elements of filler, and between particles or elements of parent metal and filler. In a preferred embodiment, there is sufficient porosity to render the preform permeable to a gaseous oxidant. Also, the preform is always permeable with respect to accommodating the development or growth of the oxidation reaction product as a matrix within the preform without substantially disturbing, upsetting, or otherwise altering the basic configuration or geometry of the preform. Spatial volume available within the preform to the development of the oxidation reaction product matrix typically will be at least about 5% of the volume of the preform as a whole, and more preferably, at least 25% of the volume of the preform. A composite ceramic article of optimized strength and integrity results from a preform composition wherein the volume percent of parent metal undergoing oxidation with the oxidant to form the desired oxidation reaction product exceeds the pore volume of the preform, as explained below in greater detail. Accordingly, the spatial volume available to development of the oxidation reaction product matrix within the preform may range from about 5% to a practical limit of about 65%, and preferably lies within the range of from about 25% to about 35%.

One or more oxidants can be employed in the process of the present invention. For example, a solid oxidant can constitute the filler, or be a constituent of the filler, and be employed simultaneous with, or independently from, a vapor-phase oxidant. If the preform, for example, contains a solid oxidant and no open porosity, the oxidation reaction product occurring within the preform will be the product of the parent metal and the solid oxidant. If the preform is surrounded only by a vapor-phase oxidant, the dense skin which develops on the surface of the preform will be the oxidation reaction product of the parent metal and the vapor-phase oxidant. If the preform is surrounded by an inert gas and packed in a powder bed consisting of a solid oxidant, the dense skin layer which develops will be the oxidation reaction product of the parent metal and the powdered oxidant surrounding the preform. If an inert filler is mixed with the solid powdered oxidant surrounding the preform, a dense skin containing the inert filler is produced. A liquid oxidant may be employed by, for example, incorporating a solid oxidant as a filler constituent in the preform, which solid oxidant melts prior to reaching the process temperature.

In a preferred embodiment, the preform is charged to a furnace, supplied with a vapor-phase oxidant, and elevated to the appropriate temperature interval to effect the conversion from a weak preform to a structural component. Depending upon the reactivity of the filler relative to the parent metal, the heating cycle may take different variations. In the preferred embodiment of this invention, the preform is charged to a furnace which has been preheated to the reaction temperature. If dopants are required, they are included in the preform or alloyed into the parent metal or both. The parent metal is melted, optimally without loss of the dimensional integrity of the preform, but the temperature is below the melting point of the oxidation reaction product and the filler. The molten parent metal reacts with the vapor-phase oxidant to form oxidation reaction product. The porosity of the preform is sufficient to accommodate the oxidation reaction product without substantially disturbing or displacing the boundaries of the preform. Continued exposure of the molten parent metal to the oxidizing environment induces transport of molten metal through the oxidation reaction product, progressively drawing molten metal into and through the oxidation reaction product towards the oxidant atmosphere causing progressive growth of the polycrystalline oxidation reaction product. The oxidation reaction product grows into the interstitial spaces of the preform. Concurrently, voids (to be distinguished from pores) are created upon migration or transport of the molten metal, those voids tending to substantially inversely replicate the size and shape of the original parent metal particulate. The volume percent of parent metal is more than sufficient to form a volume of oxidation reaction product exceeding the initial pore volume of the preform, and thus utilizing this required excess of parent metal as compared with the initial pore volume ensures that the latter is filled with oxidation reaction product during the process. If the volume percent of parent metal is too low, the resulting structure is weak because of an underdeveloped ceramic matrix, and further no dense skin will form. On the other hand, excessive parent metal may be undesirable in that the final product will contain too much metal for the end-use application. For an aluminum parent metal when reacted in air, a desirable range for this metal is about 30 to 50 volume percent of the total preform.

The initial growth of oxidation reaction product from the molten metal particulate fills the inter-particle pores of the preform and creates the voids, as noted above. Continuing the procedure promotes the continual migration of residual molten metal outwardly through the oxidation reaction product and towards at least one surface of the preform until growth of the oxidation reaction product has reached the surface(s). Oxidation reaction product than forms on the surface(s) of the preform. The resulting surface is dense relative to the subsurface zone or core of the finished composite body, because the oxidation reaction on the surface is occurring in the substantial absence of particulate parent metal which is the precursor to the void, and thus the surface is substantially free of voids. Accordingly, the core of the finished composite body (i.e., that portion or zone underlying the dense surface) is relatively porous due to the formation of voids; whereas the surface of the body is relatively dense, being comprised of the oxidation reaction product and any unreacted or non-oxidized metal constituents such as unoxidized parent metal. This dense skin is typically a small fraction of the product volume, depending largely on the volume fraction of parent metal in the preform, dimensional thickness of the final product, both controlled with respect to the intended end-use, and typically may range from about 0.1–1 millimeter, preferably 0.2–0.5 millimeter. In a structure component for use in a heat engine, and having a cross-sectional thickness of about ¼ inch, the dense layer would typically have a thickness of about 0.2 millimeter. The dense skin is retained upon cooling, exhibiting substantially increased resistance to wear as compared to the porous core of the body, whether in terms of frictional wear or erosion wear, while the ceramic composite article overall possesses excellent thermal characteristics for structural applications.

The resulting ceramic composite product includes a preform infiltrated to its boundaries by a ceramic matrix comprising a polycrystalline material consisting essentially of the oxidation reaction product of the parent metal with an oxidant and, optionally, one or more metallic constituents such as non-oxidized constituents of the parent metal or reduced constituents of the filler, or both. It further should be understood that voids are developed by a partial or essentially complete displacement of the parent metal particulate, but the volume percent of voids will depend largely on such conditions as temperature, time, type of parent metal, volume fraction of parent metal, and dopant concentrations. Typically in these polycrystalline ceramic structures, the oxidation reaction product crystallites are interconnected in more than one dimension, preferably in three dimensions, and the metallic constituents resulting from the transport of molten parent metal may be at least partially interconnected. The ceramic composite product of this invention has generally well-defined boundaries and possesses the approximate dimensions and geometric configuration of the original preform overlaid by the developed dense skin layer. The polycrystalline ceramic composite comprises metallic constituents such as non-oxidized parent metal, the amount depending largely on such factors as process conditions, alloying constituents in the parent metal, and dopants, although in certain cases it may contain substantially no metal, as illustrated by Example 7 herein. The volume percent metal can be tailored to meet the desired end-use properties for the product, and for several applications, such as engine components, it is preferred to have a metal content in the finished component of about 5-10 percent or less. In accordance with this preferred embodiment, it will be observed that the filler is essentially nonreactive with the parent metal under the process conditions. Further, although the invention is described herein with particular emphasis to aluminum and specific embodiments of aluminum parent metal, this reference is for illustration purposes only, and it is to be understood that other metals such as silicon, titanium, tin, zirconium, etc., also can be employed which meet, or can be doped to meet, the criteria of this invention. Thus, in a specific embodiment, an aluminum parent metal in particulate form is admixed with an alumina particulate filler and consolidated to the permeable green preform. In the case of this embodiment, one or more dopants is employed as further described herein, either distributed through or constituted by the filler, or alloyed into the aluminum parent metal, or both. The preform may be created or formed into any predetermined or desired size or shape by any conventional method such as slipcasting, injection molding, transfer molding, sediment casting, vacuum forming, etc., by processing any suitable filler material such as metal oxides, borides, carbides, and the like. The filler may be bonded together to form the green preform with any suitable binding agent, e.g. polyvinyl alcohol or the like, which does not interfere with the reactions of the invention, or leave undesirable residual by-products within the ceramic composite product.

Examples of materials useful in fabricating a preform in practicing the present invention, depending up on the parent metal and oxidation system chosen, may include one or more of aluminum oxide, silicon carbide, silicon aluminum oxynitride, zirconium oxide, zirconium boride, titanium nitride, barium titanate, boron nitride, silicon nitride, various ferrous alloys, e.g., an iron-chromium-aluminum alloy, carbon, and mixtures thereof. However, any suitable material may be employed in the preform. For example, if aluminum is employed as the parent metal, and aluminum nitride is the intended oxidation reaction product, aluminum nitride and/or aluminum oxide particles would be examples of suitable materials for the preform; if zirconium is employed as a parent metal, and zirconium nitride is the intended oxidation reaction product, zirconium diboride particles would comprise a suitable composition for a preform; if titanium is employed as a parent metal and titanium nitride is the intended oxidation reaction product, a preform comprised of alumina and/or titanium diboride particles would be suitable; if tin is employed as a parent metal, and tin oxide is the intended oxidation reaction product, a preform comprised of alumina particles would be suitable; or if silicon is employed as the parent metal and silicon nitride is the intended oxidation reaction product, a preform comprised of silicon nitride particles would be suitable.

The parent metal particulate should be of a suitable size so as to form voids on inverse replication that can contribute to the thermal properties of the ceramic properties but yet not be so large as to impair the structural strength or integrity of the product. Thus, a particle size for the parent metal of about 50 to 500 mesh, preferably 100 to 250 mesh, is useful. Suitable fillers may have a mesh size of from about 10 to 1000, or even finer, or an admixture of mesh sizes and types may be used. The terms "particulate" or "particle" with respect to the filler is used broadly to include powders, fibers, whiskers, spheres, platelets, agglomerates, and the like. The preform may be charged to a preheated furnace, supplied with an oxidant, such as, for example, air, that is at the process temperature. Where desired, the preform may be heated slowly or relatively rapidly (with due consideration for the creation of thermally induced stress) to or within the process temperature region, which is above the melting point of the parent metal but below the melting point of the oxidation reaction product. For example, in the case of aluminum parent metal and using air as oxidant, this temperature typically occurs over the range of from about 850°-1450° C., and more preferably of between about 900°-1350° C.

Alternatively, the assemblage of parent metal and filer may be reactive comprising a filler which reacts with the parent metal. That is, the reactive filler contains a metal constituent, e.g. silicon dioxide or boron, reducible by the molten parent metal under the process conditions. The preform may be comprised entirely of the reactive filler, or this filler may be a combination of one or more inert filler materials. For example, a composite ceramic article may be made by blending aluminum parent metal particulate with a silica-containing particulate filler, such as hydrous aluminosilicate clays, and conducting the process in air at about 900°-1200° C.

The parent metal in this embodiment is selected with several factors borne in mind. It must be present volumetrically not only in excess relative to its oxidation reaction product to the potentially available spatial volume of the preform, but in stoichiometric excess over that of the reactive constituent of the filler. This excess ensures a sufficient volume of parent metal to undergo reaction with the filler and maintain a residual quantity for the oxidation reaction to form the oxidation reaction product on the surface of the preform. The filler is chosen to be reactive with the parent metal in an oxidation-reduction reaction. Thus, the filler is comprised of a reactive constituent, typically a metal-containing constituent such as the silica constituent in clays, reducible by the molten parent metal to yield an oxidation-reduction product substantially throughout the bulk of the preform. Accordingly, although there are numerous candidates for the parent metal and numerous candidates for the filler material, the two must be coordinated to meet these functional objectives.

In this particular preferred embodiment, the preform comprising the reactive assemblage is heated to initiate the oxidation-reduction reaction prior to any substantial atmospheric oxidation of the aluminum component. Accordingly, slowly heating the preform in an atmosphere containing the oxidant is to be avoided. The preform is charged to a furnace preheated to the process temperature range. Once the oxidation-reduction reaction is initiated, it tends to be self-sustaining as it is exothermic, and therefore the temperature of the preform may rise somewhat. The oxidation-reduction reaction proceeds rapidly and substantially throughout the bulk of the preform, to develop an article at this stage which is composed of the oxidation-reduction product, reduced constituents of the reactive filler, and residual parent metal which is available for the oxidation reaction with the vapor-phase oxidant. At the conclusion of the oxidation-reduction reaction, where at least the majority of the weight change occurs, the procedure is continued as described above with regard to the growth of oxidation reaction product and the formation of a dense skin. The pores of the preform are filled with oxidation reaction product thereby resulting in the concomitant formation of voids, and residual parent metal is transported through the reaction product to the surface to form upon oxidation reaction the desired dense surface layer.

In this alternate embodiment, therefore, the heating process is essentially a two-stage procedure. The first stage raises the temperature to a reaction-effective temperature to initiate the oxidation-reduction reaction, and the second stage induces and maintains the transport of molten metal through the developing oxidation reaction product to form the dense surface layer. Preferably, this heating stage is isothermal notwithstanding the presence of the identifiable stages or steps; isothermal in the sense that the temperature of the furnace (as distinguished from the temperature of the preform) remains substantially constant.

Here again, the volume percent of metallic constituents in the ceramic product can vary, and further can be tailored to meet the desired end-use properties. Typically, the final product comprises about 20–40 volume percent metallic constituents, and preferably 25–35%. Also, the dense skin would be a small fraction of the overall volume of the product, as explained above.

Certain parent metals under specific conditions of temperature and oxidizing atmosphere meet the criteria necessary for the oxidation phenomenon of the present invention with no special additions or modifications. However, as described in the aforesaid Common Owned Patent Applications, dopant materials used in combination with the parent metal can favorably influence or promote the oxidation reaction process. While not wishing to be bound by any particular theory or explanation of the function of the dopants, it appears that some of them are useful in those cases where appropriate surface energy relationships between the parent metal and its oxidation reaction product do not intrinsically exist. Thus, certain dopants or combinations of dopants, which reduce the solid-liquid interfacial energy, will tend to promote or accelerate the development of the polycrystalline structure formed upon oxidation of the metal into one containing channels for molten metal transport, as required for the process of the present invention. Another function of the dopant materials may be to initiate the ceramic matrix growth phenomenon, apparently either by serving as a nucleating agent for the formation of stable oxidation product crystallites, or by disrupting an initially passive oxidation product layer in some fashion, or both. This latter class of dopants may not be necessary to create the ceramic growth phenomenon of the present invention, but such dopants may be important in reducing any incubation period for the initiation of such growth to within commercially practical limits for certain parent metal systems.

The function or functions of the dopant material can depend upon a number of factors other than the dopant material itself. These factors include, for example, the particular combination of dopants when two or more dopants are used, the use of an externally applied dopant in combination with a dopant alloyed into the parent metal, the concentration of the dopant, the oxidizing environment, and the process conditions.

The dopant or dopants used in conjunction with the parent metal (1) may be provided as alloying constituents of the parent metal, (2) may be applied to at least a portion of the surface of the parent metal constituents of the preform, or (3) may be applied or supplied by the filler or a part of the filler, or any combination of two or more techniques of (1), (2), and (3) may be employed. For example, an alloyed dopant may be used in combination with an externally applied dopant. In the case of technique (3), where a dopant or dopants are applied to or constitute the filler, the application may be accomplished in any suitable manner, such as by dispersing the dopants throughout part or the entire mass of the preform as coatings or in particulate form, preferably in a portion of the filler adjacent the parent metal. Application of any of the dopants to the preform may also be accomplished by applying a layer of one or more dopant materials to and within the preform, including any of its internal openings, interstices, passageways, intervening spaces, or the like, that render it permeable. In the case where the dopant is externally applied to at least a portion of the surface of the parent metal constituents of the preform, the polycrystalline oxide structure generally grows within the permeable filler substantially beyond the dopant layer (i.e., to beyond the depth of the applied dopant layer). In any case, one or more of the dopants may be externally applied to the parent metal constituents' surface and/or to the permeable filler. Additionally, dopants alloyed within the parent metal and/or externally applied to the surface of the parent metal constituents may be augmented by dopant(s) applied to or constituted by the preform. Thus, any concentration deficiencies of the dopants alloyed within the parent metal and/or externally applied to the parent metal may be augmented by additional concentration of the respective dopant(s) applied to or constituted by filler, and vice versa.

Useful dopants for an aluminum parent metal, particularly with air as the oxidant, include, for example, magnesium metal and zinc metal, in combination with each other or in combination with other dopants described below. These metals, or a suitable source of the metals, may be alloyed into the aluminum-based parent metal at concentrations for each of between about 0.1–10% by weight based on the total weight of the resulting doped metal. The concentration range for any one dopant will depend on such factors as the combination of dopants and the process temperature. Concentrations within this range appear to initiate the ceramic growth, enhance metal transport and favorably influence the growth morphology of the resulting oxidation reaction product.

Additional examples of dopant materials, useful with an aluminum parent metal, include sodium, lithium, calcium, boron, phosphorus and yttrium, which may be used individually or in combination with one or more other dopants depending on the oxidant and process conditions. Sodium and lithium may be be used in very small amounts in the parts per million range, typically about 100-200 parts per million, and each may be used alone or together, or in combination with other dopant(s). Rare earth elements such as cerium, lanthanum, praseodymium, neodymium and samarium are also useful dopants, and herein again especially when used in combination with other dopants.

As disclosed in copending U.S. patent application Ser. No. 861,024, filed May 8, 1986, now abandoned and assigned to the same assignee, a barrier means may be used to inhibit growth of development of the oxidation reaction product beyond the initial surface of the barrier. This facility can be employed to prevent dense skin formation at surfaces of the preform where such skin would be undesirable, and therefore provides the capacity to develop the dense skin selectively on the surface of the preform. A barrier means would typically only be utilized in combination with a vapor-phase oxidant, since otherwise selective control of dense skin formation on the surface of the preform can be easily controlled by positioning the availability of an oxidant such as a solid or liquid oxidant. Suitable barrier means may be any material, compound, element, composition, or the like, which, under the process conditions of this invention, maintains some integrity, is not volatile, and preferably is permeable to the vapor-phase oxidant while being capable of locally inhibiting, poisoning, stopping, interfering with, preventing, or the like, continued growth of oxidation reaction product. Calcium sulfate (Plaster of Paris), calcium silicate, and portland cement and mixtures thereof, typically are applied as a slurry or paste to the surface of the filler material. These barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed is especially desirable. For example, if the preform comprises alumina and the resulting ceramic comprises alumina, the barrier may be admixed with alumina particulate, desirably having a mesh size of about 20-1000.

EXAMPLE 1

A ceramic composite piston engine exhaust port liner bearing a porous core and dense skin was fabricated according to the present invention as follows:

Alumina slip was prepared by mixing 245 parts of A-17 alumina (Alcoa) with 60 parts of water in a shear blender. Seven drops of Darvan-7 per 300 g batch (R. T. Vanderbilt Co., Norwalk, Conn. 06855) were slowly added to disperse alumina. Blending was continued for 2 hours to obtain a good slip. The slip was stored on a pair of rolls to keep it continuously agitated. The slip was placed in a freezer before slipcasting to cool it to zero degrees centigrade. Cooling of the slip minimized the reaction between aluminum alloy powder (used as parent metal in this example) and water. After the slip has cooled to 0° C. it was taken out of the freezer and 126 parts of −200 mesh aluminum alloy powder (per compositions shown in Table A) added to it and mixed for about 20 seconds. The slip containing aluminum alloy parent metal powder was immediately poured into a plaster of paris mold whose cavity was shaped to the configuration of a piston engine exhaust port liner, and drained in about 40 seconds to yield a 3.6 mm thick preform. The preform was released from the mold and dried in an oven at 80° C. for 24 hours. The preform underwent less than 1% shrinkage during slipcasting and drying. The preform was subsequently heated in air to 1000° C. in 12 hours and held at the temperature for 30 hours. The temperature was then raised to 1300° C. in 6 hours and the body was held at 1300° C. for 12 hours. The temperature was then brought down to room temperature in 20 hours.

Figure 2:
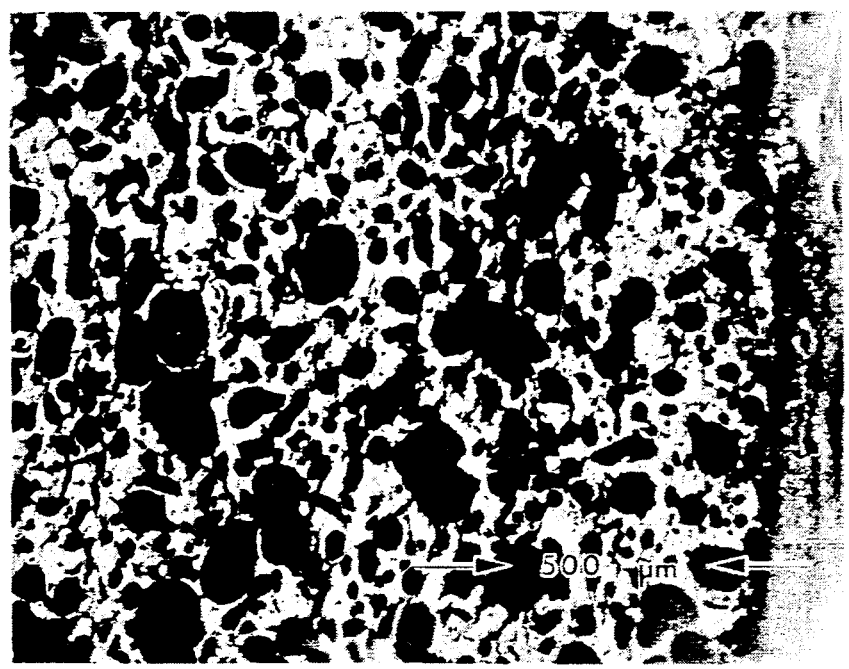
FIG. 2 is a photomicrograph of a cross-sectional view of the wall of the liner of FIG. 1.

The resulting composite exhaust port liner which formed showed a uniform 0.2-0.3 mm thickness of dense skin on both inside and outside surface together with a porous core wall. A photograph of the resulting exhaust port liner structure is shown in FIG. 1. The preform gained 16.7% weight during the firing cycle due to oxidation of the parent metal by air. The thickness of the part increased from the preform stage to finished part by 3.6 to 4.6 mm. A cross-section of a wall of the dense-skinned, porous core composite port liner appears as FIG. 2.

TABLE A

| Size Range of Powder | Tin | Zinc | Copper | Nickel | Silicon | Iron | Magnesium | Chromium | Manganese | Titanium | Aluminum |
| --- | --- | --- | --- | --- | --- | --- | --- | --- | --- | --- | --- |
| −200 mesh | 1.71% | 3.50% | 4.21% | 0.07% | 8.12% | 1.22% | 0.10% | 0.06% | 0.21% | 0.8% | Balance |
| −80 + 200 mesh | 1.30% | 3.42% | 4.28% | 0.12% | 8.63% | 1.29% | 0.16% | 0.09% | 0.21% | 0.8% | Balance |

EXAMPLE 2

This example shows the formation of a dense skin in a body produced from a slip containing reactive filler (EPK kaolin) employed with an aluminum parent metal powder.

Seventy parts EPK kaolin (Feldspar Corporation, Edgar, Fla.) were mixed with 30 parts of water in a blender and mixed at a high shear rate for 2 hours. About 12 drops of Darvan-7 were added per 300 g batch for dispersing kaolin. Once the slip was prepared, 100 parts of the slip were mixed with 70 parts of (−80+100 mesh) aluminum alloy powder (same composition as −80+200 mesh powder in Example 1) for 20 seconds. The slip was cast on a flat plaster of paris disc to form a 3-4 mm thick disc of 1" diameter. The slip cast piece was dried at 80° C. for 24 hours and fired in furnace at 1000° C. in air for 24 hours. The heating and cooling times were about 1 hour. After firing, the sample showed a porous interior consisting of a porous core having pores of the approximate size and shape as the precursor aluminum alloy powder, with a dense skin. The thickness of the dense skin was about 0.2 mm. X-ray analysis indicated that the body contained alpha-$Al_2O_3$, Si and an aluminum alloy.

Figure 3:
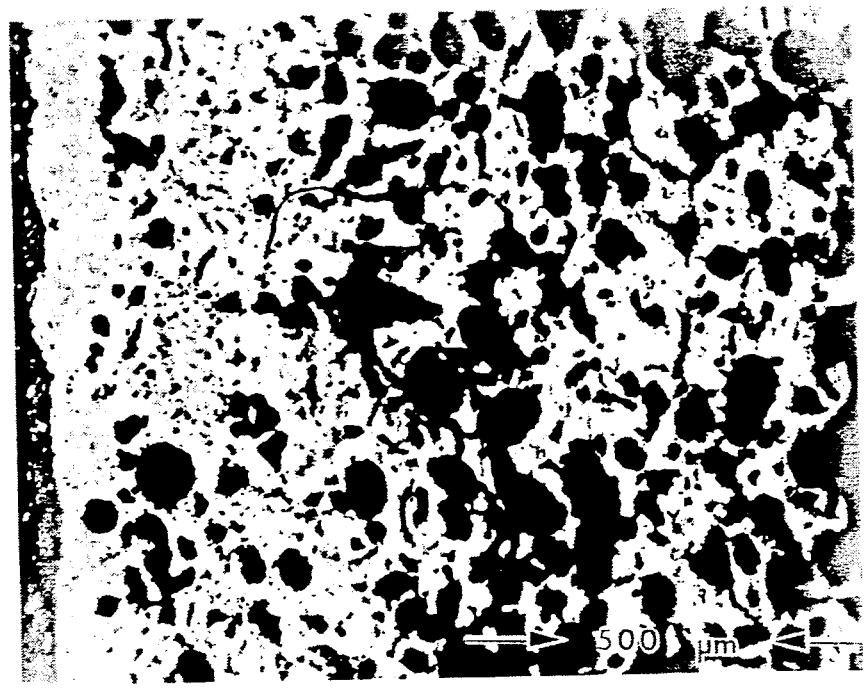
FIG. 3 is a photomicrograph of a cross-sectional view of the composite body of Example 2 below.

A photomicrograph showing a cross-section of the resulting composite body appears as FIG. 3.

EXAMPLE 3

Figure 4:
FIG. 4 is a photograph of ceramic composite exhaust port liners of Example 3 below.

This example shows that the dense skin formation is not dependent on particle size of the parent metal powder. An alumina slip was prepared by mixing 245 parts of A-17 and 60 parts of water in a shear blender. Seven drops of Darvan-7 (R. T. Vanderbilt Co., Norwalk, Conn. 06855) per 300 g batch were added to disperse alumina. Blending was continued for 2 hours to obtain a good consistency in the slip. The slip was stored on a pair of rolls to keep it agitated. The slip was placed in a freezer before slipcasting to cool it to 0° C. Once the slip was cooled to 0° C. it was taken out of the freezer and divided into three batches. Aluminum alloy powders (126 parts of the aluminum alloy powder to 300 parts of the slip) of three different particle size (−200 mesh, −80+200 mesh, −80+100 mesh, same compositions as per Example 1) were added to separate batches to serve as parent metal. The slips with aluminum powders were mixed for 20 seconds and slip cast in a plaster of paris mold for an exhaust port liner. The slip was drained in 40–70 seconds. The slipcast preforms were released from the mold and dried at 80° C. for 24 hours. The preforms were loaded in a furnace and the temperature raised to 1000° C. in 12 hours. The temperature was held at 1000° C. for 20 hours and, subsequently, raised to 1300° C. in 6 hours. After holding at 1300° C. for 12 hours, the temperature was brought down to room temperature in 20 hours. Table B summarizes the results of the experiment. FIG. 4 shows the photograph of the exhaust port liners made.

Corporation, Edgar, Fla. 32049) were prepared. The alumina slip was prepared by blending 245 parts of A-17 in 60 parts of water. The alumina was dispersed using 7 drops/300 g batch of Darvan-7 (R. T. Vanderbilt Co., Norwalk, Conn.). The EPK slip was prepared by blending 70 parts of EPK with 30 parts of water. This slip also used Darvan-7 as the dispersant (12 drops/300 g batch). The slips were blended for about 2 hours at high shear rate and subsequently transferred to a pair of rolls where they were kept agitated. Just before slipcasting, an aluminum parent metal alloy powder (as per −80+200 mesh batch of Example 1) was mixed with the slips and the slips were immediately cast in plaster of paris molds and drained after 40 seconds to form a preform 3–4 mm in thickness. The proportion of aluminum alloy powder and the firing temperatures are shown in Table C.

TABLE C

| Percentage*** of Aluminum Alloy Parent Metal Powder in the Slip | Size of Al Powder | Firing Temp. (°C.) | Firing Time (hrs) | Remarks on Skin Formation |
| --- | --- | --- | --- | --- |
| 29* | (−80 + 200 mesh) | 1300 (Ramp up 15 hrs Ramp down 23 hrs) | 24 | No uniform skin formed. Spotty appearance at the surface |
| 34* | (−80 + 200 mesh) | 1300 (Ramp up 15 hrs Ramp down 23 hrs) | 24 | Dense skin formed uniformly |
| 50** | (−80 + 100 mesh) | 1000 (Ramp up ½ hr Ramp down ½ hr) | ½ | Thin, uniform dense skin formed at the surface |
| 43.4** | (−80 + 100 mesh) | 1000 (Ramp up ½ hr Ramp down ½ hr) | 2 | No skin formed, spotty appearance |

*alumina slip
**EPK slip
***as a perentage of total solid weight

It was found that when the proportion of parent metal alloy powder was 29% (of the total weight of solids) in the alumina slip no dense skin formed while a uniform dense skin formed when a slip containing 34% metal powder of the same alloy was fired in an identical way.

Similar phenomenon was observed in EPK-containing slips. When the proportion of parent metal alloy powder was 43.4% (of the total weight of solids) no skin was formed. The body had a spotty appearance. Whereas when a slipcast body containing 50% of the same parent alloy powder was fired under identical conditions but for shorter times (2 hours vs. ½ hours) a uniform, dense skin was formed.

EXAMPLE 5

This example shows that the dense skin formation takes place in pressed preforms as well, and that therefore method of forming the preforms (e.g. slipcasting in

TABLE B

| Size of Aluminum Alloy Parent Metal Powder | % Aluminum Alloy Parent Metal Powder | Shrinkage During Slipcasting and drying (%) | Weight Gain After Firing (%) | Change in Diameter After Firing (%) | Change in Thickness After Firing (%) | Remarks |
| --- | --- | --- | --- | --- | --- | --- |
| −200 mesh | 34* | less than 1 | 15.7 | 1.7 | 32 | Good uniform skin |
| (−80 + 200 mesh) | 34* | less than 1 | 29.6 | 2.5 | 32 | Good uniform skin |
| (−80 + 100 mesh) | 34* | less than 1 | 20.6 | 4.0 | 35 | Good uniform skin |

*As a percentage of total weight of solids in the slip.

EXAMPLE 4

This example shows that the proportion of parent metal alloy to filler is important for the dense skin formation. Two slips, one containing alumina (A-17, Alcoa) and the other containing EPK kaolin (Feldspar previous examples vs. pressing in this example) is not critical to the development of the dense skin layer.

In this case 66% of A-17 alumina (Alcoa) was mixed separately with aluminum parent metal alloy powders (same alloy as per Example 1) of two size ranges. −200 mesh and −80+200 mesh. The mixing was carried out in a mortar and pestle for 30 minutes until a uniform mixture was obtained. These mixtures were pressed in a steel die set into ⅛" thick, 1" diameter pellets at 10,000 psi without any binders. The bodies were subsequently placed on a refractory alumina slab and fired. The firing schedule consisted of raising the temperature of the bodies to 1000° C. in 12 hours, holding at 1000° C. for 30 hours, raising the temperature to 1300° C. in 6 hours, holding for 12 hours at 1300° C. and cooling to room temperature in 20 hours. The results of this study are given in Table B.

posite bodies produced using cerium zirconate in the preform were found to have Alpha-$Al_2O_3$, $Ce_{.75}Zr_{.25}O_2$ and tetragonal zirconia, while those prepared using $Li_2ZrO_3$ in the preform were formed to have gamma-$LiAlO_2$, monoclinic $ZrO_2$ and $LiAl_5O_8$ in the end product.

EXAMPLE 7

This example shows that formation of the dense skin can be selectively developed on the composite body by using a barrier material which prevents unwanted skin growth on selected surfaces of the preform under the experimental conditions.

TABLE D

| Percentage*** of Aluminum Alloy Parent Metal Powder (%) | Size Range of Aluminum Alloy Parent Metal Powder | Change in Diameter on Firing (%) | Change in Thickness on Firing (%) | Change in Weight on Firing (%) | Remarks on Skin Formation |
|---|---|---|---|---|---|
| 34 | −200 mesh | 9 | 12.4 | 15.4 | dense uniform skin |
| 34 | −80 + 200 mesh | 6.2 | 18.2 | 22.9 | dense uniform skin |

EXAMPLE 6

This example shows that dense skin forms in cases where a ceramic body contains more than one ceramic phase and is a further example of employing reactive filler in the preform.

In this case, cerium zirconate and lithium zirconate (−200 mesh, Electronic Space Products, International, Westlake, Calif. 91362) were separately mixed in predetermined proportions (shown in Table E) with aluminum alloy parent metal powder (same alloy as Example 1). The mixtures were mixed thoroughly in an agate mortar for ½ hour. They were subsequently pressed into pellets of 1" diameter in a mechanical press at 10,000 psi without any lubricant. The preformed pellets were subsequently fired in air. The firing cycle consisted of raising the temperature of the furnace to 1000° C. in 12 hours, holding the temperature at 1000° C. for 24 hours, raising the temperature from 1000° to 1300° C. in 6 hours, holding at 1300° C. for 12 hours, and cooling from 1300° C. to room temperature in 20 hours.

The results of these studies are shown in Table E.

In this experiment, two identical preform bodies intended as piston engine exhaust port liners were prepared using a procedure outlined in Example 3. Both of these ports contained 34% −200 mesh aluminum alloy powder (same alloy as per Example 1). One of the preforms was coated with a slurry consisting of plaster of paris and 30% 500 grit silica, which serves as a barrier to growth of the skin due to the inability of the aluminum alloy to wet this material. The coating was applied to the inner surface of the preform while the outer surface was not coated. For the second preform body, none of the surfaces was coated with the above barrier material. Both of these bodies were set on a refractory alumina plate and fired in air. The firing consisted of raising the temperature to 1000° C. in 18 hours, holding the temperature at 1000° C. for 20 hours, and cooling the furnace back to room temperature in 10 hours. After firing it was found that the first preform yielded a porous body which had dense uniform skin on the outer surface which had not been coated with the barrier, while no skin developed on the inner surface which was coated with the barrier. The control preform body

TABLE E

| Percentage of Aluminum Solid Wt.) Parent Metal Powder (%) | Size Range of Powder (%) | Weight Gain During Firing (%) | Change in Dia. During Firing (%) | Change in Thickness During Firing (%) | Phases Present after Firing | Remarks on Surface skin |
|---|---|---|---|---|---|---|
| 34* | (−80 + 200 mesh) | 25.8 | 10.6 | 20.7 | alpha-$Al_2O_3$ $Ce_{.75}Zr_{.25}O_2$ tetragonal $ZrO_2$ | Sample is yellow with dense gray skin |
| 50* | (−200 mesh) | 36.9 | — | — | $Ce_{.75}Zr_{.25}O_2$ alpha-$Al_2O_3$ tetragonal $ZrO_2$ | Sample is yellow with dense gray skin |
| 34** | (−80 + 200 mesh) | 24.2 | 7.4 | 13.4 | gamma-$LiAlO_2$ monoclinic $ZrO_2$ $LiAl_5O_8$ | Sample is yellow with dense gray skin |
| 50** | (−200 mesh) | 29.9 | — | — | $LiAl_5O_8$ monoclinic $ZrO_2$ gamma-$LiAlO_2$ | Sample is yellow with dense gray skin |

Figure 5:
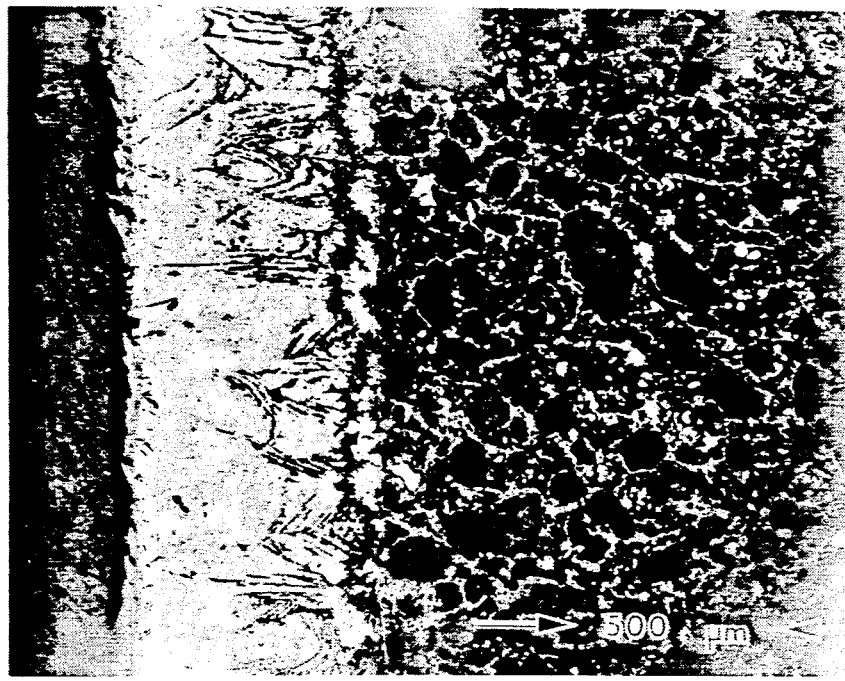
FIG. 5 is a photomicrograph showing a skin of alpha-alumina containing metal on a ceramic body of Example 6 below.

*mixture containing cerium zirconate
**mixture containing lithium zirconate
***as a percentage of total solid weight It was found that a gray skin of alpha-alumina containing some metal (see micrograph FIG. 5) was formed both when mixture contained 34 and 50% parent aluminum alloy powder of two size range and cerium zirconate were fired. The interior of the bodies was very porous and contained no detectable (by X-ray diffraction) amounts of either aluminum or silicon. The comwhich had no barrier on either surface showed dense and uniform skin on both surfaces and a porous core.

EXAMPLE 8

This example illustrates that a port liner produced with dense skin is strong enough to survive the stresses during the process of casting an aluminum alloy around it, as might be desirable in producing an engine cylinder head.

In order to make a port liner with a dense skin, 245 parts of A-176 alumina were mixed with 60 parts of water in a blender at a high shear rate. Seven drops of Darvan-7 per 300 g batch were gradually added to the slurry while mixing continued. The slurry was mixed for 2 hours and, subsequently, transferred to a pair of rolls where it was kept agitated continuously. Before slipcasting, slip was transferred to a freezer to cool it down to 0° C. Once the slip was cooled it was mixed with 135 parts of −80+100 mesh aluminum powder (per −80+200 mesh batch of the alloy from Example 1) for 20 seconds. The slip was cast immediately in a plaster of paris mold and drained in 40 seconds. The process yielded a preform of 3.8 mm thickness and 39.2 mm outer diameter. The preform was released from the mold and dried at 80° C. for 24 hours. The dried preform was set on a refractory alumina plate and fired in air. The firing process consisted of raising the temperature of the furnace to 1000° C. in 12 hours, holding at 1000° C.

After firing, the resulting ceramic composite port liner was found to have a dense skin 0.2 to 0.3 mm in thickness, on both inside and outside surfaces. The diameter of the port had increased from 39.2 to 39.9 mm, while the thickness had increased from 3.8 to 4.4 mm.

Figure 6:
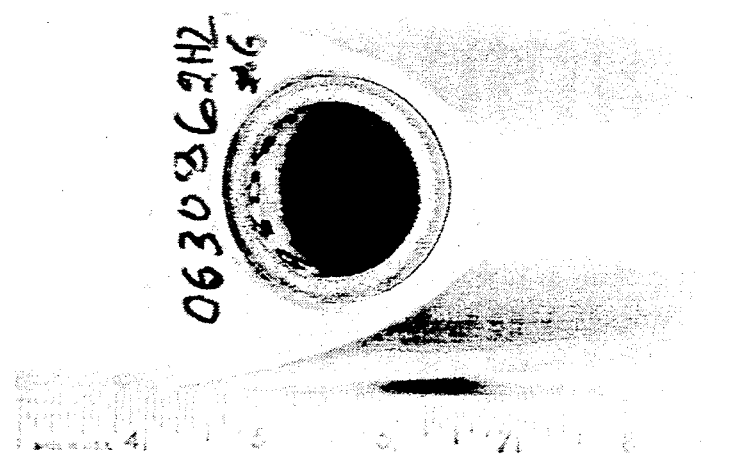
FIG. 6 is a photograph of the metal casting and exhaust port liner of Example 8 below.

This ceramic composite was then preheated to 400° C. and set in a steel mold. Molten aluminum alloy of nominally the same composition as in Example 1 was then poured around the port at 700° C. The casting was allowed to cool and, subsequently, released from the mold. FIG. 6 shows the metal casting with exhaust port liner in place. The exhaust port liner was not cracked or deformed, indicating that the exhaust port liner was strong enough to withstand the stresses during the casting process.

What is claimed is:

1. A method for making a self-supporting ceramic composite article having a porous core bearing a dense surface layer formed integrally with said core, comprising the steps of:
   a) preparing a preform comprising filler material and parent metal distributed through said filler material and wherein the volume percent of parent metal is sufficient to form a volume of oxidation reaction product exceeding the total spatial volume available within said preform;
   b) melting said parent metal in the presence of at least two oxidants and reacting the resultant molten parent metal on contact therewith to form an oxidation reaction product;
   c) transporting said molten parent metal within said oxidation reaction product towards said oxidant to continue forming oxidation reaction product within said preform thereby substantially filling said total spatial volume, and concurrently forming voids substantially throughout said preform which at least partially inversely replicate the geometry of said parent metal;
   d) continuing said reaction for a time sufficient to transport molten parent metal through said oxidation reaction product towards said oxidant and to at least one surface of said preform to form a dense surface layer of oxidation reaction production said at least one surface, said dense surface layer being substantially free of voids; and
   e) recovering said ceramic composite article.

2. The method according to claim 1 wherein said at least two oxidants comprise at least two materials selected from the group consisting of at least one vapor-phase oxidant, at least one liquid oxidant and at least one solid oxidant.

3. The method according to claim 2 wherein said at least one vapor-phase oxidant comprises a material selected from the group consisting of: air, oxygen, nitrogen, and forming gas.

4. The method of claim 1, wherein said at least two oxidants are substantially different in composition from one another.

5. The method of claim 1, wherein said at least two oxidants comprise at least one vapor-phase oxidant and at least one solid oxidant.

6. The method of claim 1, wherein said at least two oxidants comprise at least one vapor-phase oxidant and at least one liquid oxidant.

7. The method of claim 1, wherein said at least two oxidants comprise at least one liquid oxidant and at least one solid oxidant.

* * * * *